United States Patent
Sood

(10) Patent No.: US 9,665,671 B1
(45) Date of Patent: May 30, 2017

(54) EMULATING POWER GATING FOR A CIRCUIT DESIGN USING A PROGRAMMABLE INTEGRATED CIRCUIT

(71) Applicant: Xilinx, Inc., San Jose, CA (US)

(72) Inventor: Santosh Kumar Sood, New Delhi (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/995,678

(22) Filed: Jan. 14, 2016

Related U.S. Application Data

(62) Division of application No. 14/452,840, filed on Aug. 6, 2014, now Pat. No. 9,268,901.

(51) Int. Cl.
   *G06F 17/50* (2006.01)
   *H03K 19/177* (2006.01)
   *G06F 1/32* (2006.01)

(52) U.S. Cl.
   CPC ........ *G06F 17/5027* (2013.01); *G06F 1/3287* (2013.01); *H03K 19/17772* (2013.01)

(58) Field of Classification Search
   None
   See application file for complete search history.

(56) References Cited

U.S. PATENT DOCUMENTS

| | | | |
|---|---|---|---|
| 6,144,219 A | 11/2000 | Palaniswami | |
| 7,982,498 B1 | 7/2011 | Chen | |
| 8,352,235 B1 * | 1/2013 | Lin | G06F 17/5036 703/14 |
| 2010/0042858 A1 | 2/2010 | Padhye | |
| 2011/0221502 A1 * | 9/2011 | Meijer | G01R 31/318508 327/333 |
| 2013/0238916 A1 | 9/2013 | Dohm | |
| 2014/0298068 A1 * | 10/2014 | Kosonocky | G06F 1/3287 713/324 |

FOREIGN PATENT DOCUMENTS

WO    WO 2009023651 A2 *    2/2009   ......... G06F 17/5045

OTHER PUBLICATIONS

Specification and drawings for U.S. Appl. No. 14/452,840, filed Aug. 6, 2015, Sood.

* cited by examiner

*Primary Examiner* — Douglas W Owens
*Assistant Examiner* — James H Cho
(74) *Attorney, Agent, or Firm* — Kevin T. Cuenot

(57) ABSTRACT

Emulating power gating includes identifying an isolation circuit having a first input coupled to an output of a first power domain, a second input coupled to an isolation signal, and an output coupled to an input of a second power domain; removing a power gate circuit configured to selectively decouple the first power domain from a power supply responsive to a power gate signal; and decoupling the first input of the isolation circuit from the output of the first power domain. A power gate emulation circuit is inserted using a processor. The power gate emulation circuit is coupled to the isolation signal, the power gate signal, and the output of the first power domain.

11 Claims, 6 Drawing Sheets

EMULATING POWER GATING FOR A CIRCUIT DESIGN USING A PROGRAMMABLE INTEGRATED CIRCUIT

CROSS-REFERENCE TO RELATED APPLICATION

This application is a divisional of U.S. patent application Ser. No. 14/452,840 filed on Aug. 6, 2014, which issued as U.S. Pat. No. 9,268,901 on Feb. 23, 2016, and which is hereby incorporated herein by reference.

TECHNICAL FIELD

This disclosure relates to integrated circuits (ICs) and, more particularly, to emulating power gating for a circuit design using a programmable IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Programmable ICs are often used to prototype custom IC designs such as Application Specific Integrated Circuits (ASICs). An ASIC circuit design may be rapidly implemented within a programmable IC and emulated by the programmable IC for testing and verification purposes. While prototyping an ASIC circuit design using a programmable IC is largely beneficial, particular aspects of circuit designs relating to power domain management are not supported by most programmable ICs.

SUMMARY

A method of processing a circuit design includes identifying an isolation circuit having a first input coupled to an output of a first power domain, a second input coupled to an isolation signal, and an output coupled to an input of a second power domain, removing a power gate circuit configured to selectively decouple the first power domain from a power supply responsive to a power gate signal, and decoupling the first input of the isolation circuit from the output of the first power domain. The method also includes inserting, using a processor, a power gate emulation circuit coupled to the isolation signal, the power gate signal, and the output of the first power domain.

A system includes a processor programmed to initiate executable operations. The executable operations include identifying an isolation circuit having a first input coupled to an output of a first power domain, a second input coupled to an isolation signal, and an output coupled to an input of a second power domain, removing a power gate circuit configured to selectively decouple the first power domain from a power supply responsive to a power gate signal, and decoupling the first input of the isolation circuit from the output of the first power domain. The executable operations also include inserting a power gate emulation circuit coupled to the isolation signal, the power gate signal, and the output of the first power domain.

An integrated circuit (IC) includes a first power region, a second power region, and a power gate emulation circuit. The power gate emulation circuit is coupled to an output signal of the first power region, an isolation signal for the second power region, and a power gate signal for the first power region. The IC further includes an isolation circuit having a first input coupled to an output of the emulation circuit, a second input coupled to the isolation signal, and an output coupled to an input of the second power region. The power gate emulation circuit is configured to pass the output signal of the first power region or an inverted version of the output signal of the first power region according to a state of the power gate signal and a state of the isolation signal.

Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 is a block diagram illustrating an exemplary circuit design for power gating.

DETAILED DESCRIPTION

Figure 1:
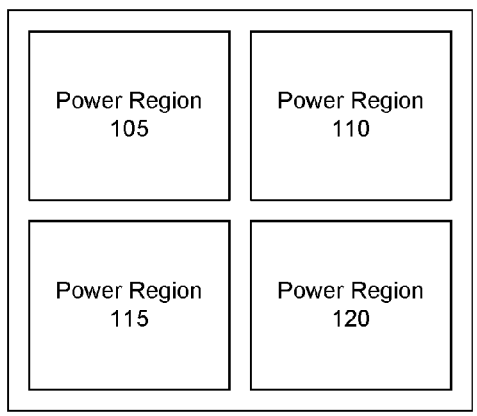
FIGS. 1-1 and 1-2 are block diagrams illustrating an exemplary integrated circuit (IC) having power regions.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to emulating power domains using programmable ICs. In accordance with the inventive arrangements described within this disclosure, a programmable IC may be used to emulate power domain operation for a circuit design. The circuit design may be modified to incorporate power gate emulation circuitry configured to detect an invalid state, e.g., an error condition, caused by incorrect timing of the control signals that power on and/or power off power domains and isolate power domains within the circuit design.

For example, a circuit design for an Application Specific Integrated Circuit (ASIC), a System-On-A-Chip (SOC), or the like may include two or more power domains. Each power domain specified within the circuit design is architected, or designed, independently of the others. As such, each power domain generally may be powered on or off independently of the other power domains. During the normal course of operation of the circuit design, one or more power domains are powered off, while one or more other power domains remain powered on. Similarly, one or more power domains that are powered off may be powered on while one or more other power domains that are powered on may be powered off.

Often, a first power domain provides one or more data signals to a second power domain. Care must be taken to ensure that data signals that propagate from the first power domain to the second power domain remain in a known state regardless of whether the first power domain is powered on or powered off. Powering off the first power domain, for example, prior to ensuring that the data signal(s) provided to the second power domain are placed in a known state may result in an error condition as incorrect data signals or data signals with an unknown state are provided as inputs to the second power domain.

In one aspect, the inventive arrangements described herein may be implemented as a method or process performed by a data processing system for modifying a circuit design for emulation of power domains using a programmable IC. In another aspect, the inventive arrangements may be implemented as a system having a processor configured to execute program code. The system modifies a circuit design for emulation of power domains. In still another aspect, the inventive arrangements may be implemented as a non-transitory computer-readable storage medium storing program code that, when executed, causes a processor and/or a system to perform and/or initiate a method or process. In yet another aspect, the inventive arrangements may be implemented as circuitry within an IC including a programmable IC.

Several definitions that apply throughout this document now will be presented. As defined herein, the term "power domain" means a portion of a circuit design where the component(s) are powered on and off collectively as a group and independently of other power domains in the circuit design. As defined herein, the term "power region" refers to a physical region of an IC wherein a power domain is implemented. Power regions and power domains are associated on a one-to-one basis. Thus, within this specification, the term "power region" is used in discussing an IC, while the term "power domain" is used in discussing a circuit design. In view of the relationship between power domains and power regions, a power region within an IC may use the same reference number as the power domain included in that power region.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figures 1, 2:
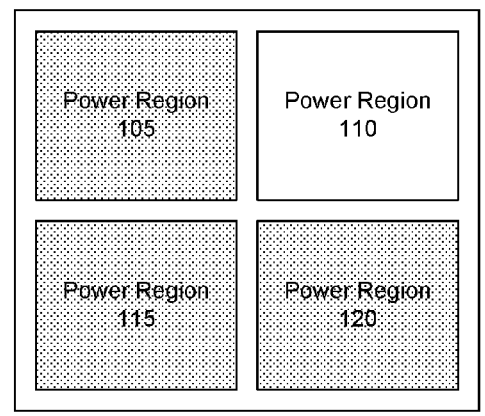
Figure 2:
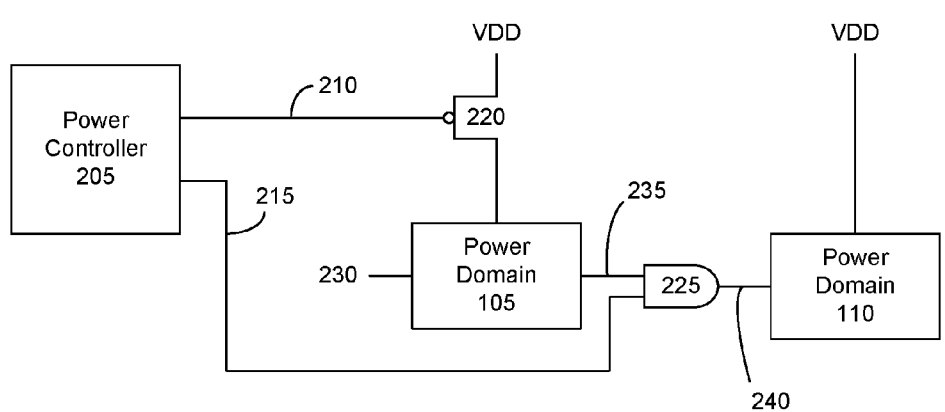

FIGS. 1-1 and 1-2 are block diagrams illustrating an exemplary IC having power regions. FIG. 1-1 illustrates an IC 100 including a plurality of power regions 105, 110, 115, and 120. In one example, IC 100 is an ASIC. In another example, IC 100 is an SOC. Each of power regions 105, 110, 115, and 120 may be powered on and powered off independently of each other power region. Typically, each of power regions 105, 110, 115, and 120 is powered on and off using control signals provided from a power controller (not shown). In order to ensure correct operation, the control signals must be properly timed.

It should be appreciated that the particular number of power regions shown in FIG. 1-1 is for purposes of illustration only and is not intended as a limitation. An IC may include fewer power regions or more power regions than shown.

FIG. 1-2 illustrates an exemplary use case with a power region powered on and other power regions powered off. In particular, FIG. 1-2 shows power region 110 powered on, while power regions 105, 115, and 120 are powered off. Shading indicates a powered off status of power regions 105, 115, and 120.

FIG. 2 is a block diagram illustrating an exemplary circuit design 200 for power gating. Circuit design 200 represents a portion of the circuit design implemented within IC 100 of FIG. 1, for example. In this regard, circuit design 200 includes only power domain 105 for power region 105 and power domain 110 for power region 110. Power domains 115 and 120 have been excluded for purposes of illustration. Circuit design 200 illustrates how to control power domains 105 and 110.

As pictured, a power controller 205 is included. Power controller 205 provides control signals for power domain 105 and power domain 110. More particularly, power controller 205 generates a power gate signal 210 and an isolation signal 215. Power gate signal 210 is provided to a power gate circuit 220. Power gate circuit 220 couples power domain 105 to a power supply shown as VDD and decouples power domain 105 from the power supply VDD responsive to power gate signal 210. In one example, power gate circuit 220 is implemented as a P-type complementary metal-oxide semiconductor (CMOS) transistor. It should be appreciated, however, that any of a variety of switch circuits known in the art, whether or not more complex, may be used in place of the P-type CMOS transistor.

Power domain 105 includes an input that receives an input signal 230. Input signal 230 is a data signal and may be a multi-bit signal. Power domain 105 includes an output that generates an output signal 235. Output signal 235 is a data signal and may be a multi-bit signal. Output signal 235 is provided to a first input of isolation circuit 225. Isolation signal 215 is provided to a second input of isolation circuit 225. In one example, isolation circuit 225 is implemented as an AND circuit, e.g., an AND logic gate that is configured to perform logical AND operations.

Isolation circuit 225 includes an output that generates an output signal 240. Output signal 240 is a data signal and may be a multi-bit signal. Output signal 240 is provided to an input of power domain 110. Power domain 110 includes an output from which an output signal is generated (not shown).

As illustrated, power domain 105 is either coupled to VDD (powered on) or decoupled from VDD (powered off) depending upon the state of power gate signal 210. Power domain 110 may be turned on and/or off regardless of the state of power domain 105. Power controller 205 remains powered on at all times regardless of the state of power domain 105.

Isolation circuit 225 operates in conjunction with isolation signal 215 to prevent output signal 235 from propagating to power domain 110 in an incorrect and/or unknown state. For example, prior to power domain 105 being powered off, isolation signal 215 is pulled low to a logic zero. With isolation signal 215 at a logic zero, output signal 235 does not pass isolation circuit 225, which generates a logic zero for output signal 240. Subsequent to power domain 105 being powered on, isolation signal 215 is pulled high to a logic one. With isolation signal 215 at a logic one, output signal 240 accurately mimics, or passes, output signal 235. If isolation circuit 225 were excluded, output signal 235 may take on incorrect or unknown values during power off and/or power on of power domain 105, which potentially introduces an error condition into power domain 110.

Figure 3:
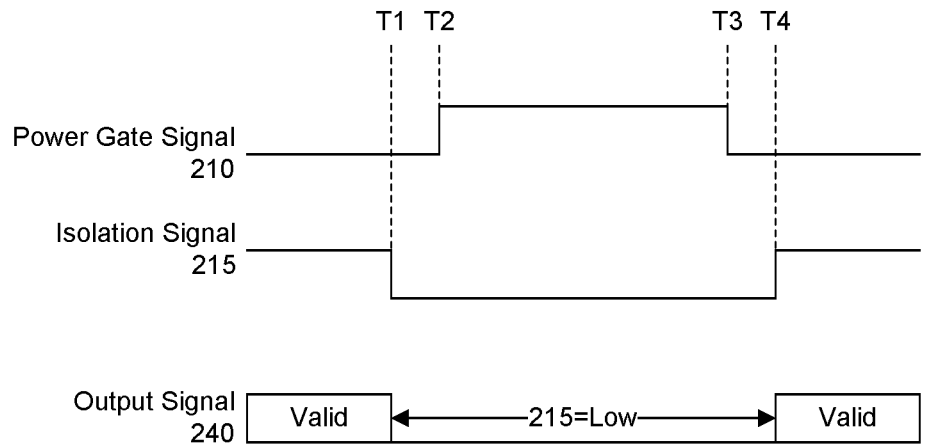
FIG. 3 is a signal diagram illustrating valid states for power gating control signals.

FIG. 3 is a signal diagram illustrating valid states for power gating control signals. FIG. 3 illustrates a case where the power gating control signals are correctly timed. As pictured, isolation signal 215 is asserted, i.e., pulled low, at time T1. At time T2, which is after time T1, power gate signal 210 is asserted, i.e., pulled high, thereby powering off power domain 105. By asserting isolation signal 215 prior to power gate signal 210, output signal 240 is effectively zeroed and placed in a known state while power domain 105 is powered off to prevent spurious values on output signal 240.

At time T3, power domain 105 is powered on by de-asserting power gate signal 210. After de-asserting power gate signal 210, at time T4, isolation signal 215 is de-asserted. Thus, any spurious values on output signal 240 are prevented by keeping isolation signal 215 asserted while power domain 105 is initially powered on. Once power domain 105 is powered on, isolation signal 215 is de-asserted and output signal 240 is valid.

Figure 4:
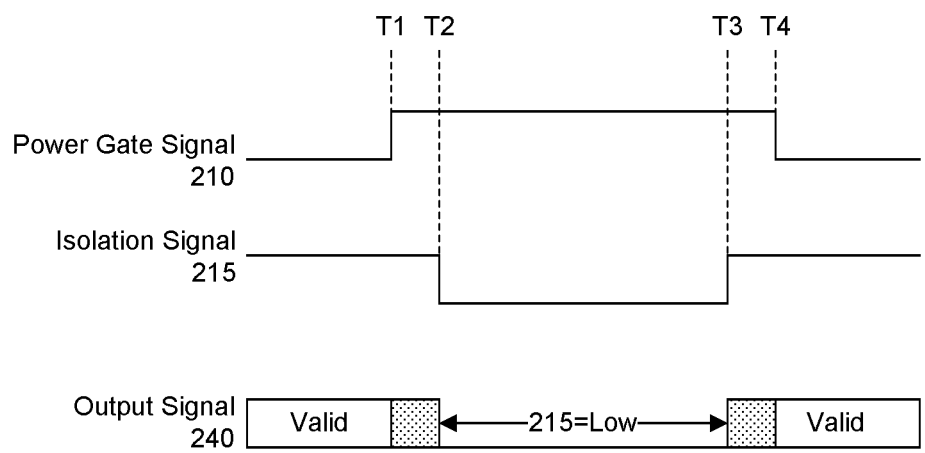
FIG. 4 is a signal diagram illustrating invalid states for power gating control signals.

FIG. 4 is a signal diagram illustrating invalid states for power gating control signals. FIG. 4 illustrates a case where the power gating control signals are incorrectly timed. A first type of invalid state occurs when power domain 105 is powered off prior to asserting isolation signal 215. As pictured, power gate signal 210 is asserted at time T1. At time T2, isolation signal 215 is asserted. The shaded portion of output signal 240 indicates the window of time where output signal 240 is invalid.

A second type of invalid state occurs when power domain 105 is powered on after de-asserting isolation signal 215. At time T3, isolation signal 215 is de-asserted, which allows values generated by power domain 105 to be passed to power domain 110. Power domain 105, however, is not powered on until time T4. The shaded portion between time T3 and time T4 for output signal 240 indicates the window of time where output signal 240 is invalid.

It should be appreciated that the first type of invalid state may occur without the second type of invalid state, the second invalid state may occur without the first invalid state, or both the first and second invalid states may occur. In any case, the invalid state is characterized the isolation circuit allowing an output from a power domain to pass while that power domain is either being powered off or powering on. In this example, the invalid states are characterized by power gate signal 210 and isolation signal 215 taking on logic high values concurrently.

Circuit designs under development are often prototyped using programmable ICs as part of an emulation environment. While the electronic design automation (EDA) tools available for custom IC design, e.g., ASIC design, support the creation and specification of power domains, programmable ICs do not support power domains and power regions. A programmable IC cannot be used to prototype power domain behavior of a circuit design. In accordance with the inventive arrangements disclosed herein, a programmable IC may be used to emulate the behavior of power domains of a circuit design.

Figure 5:
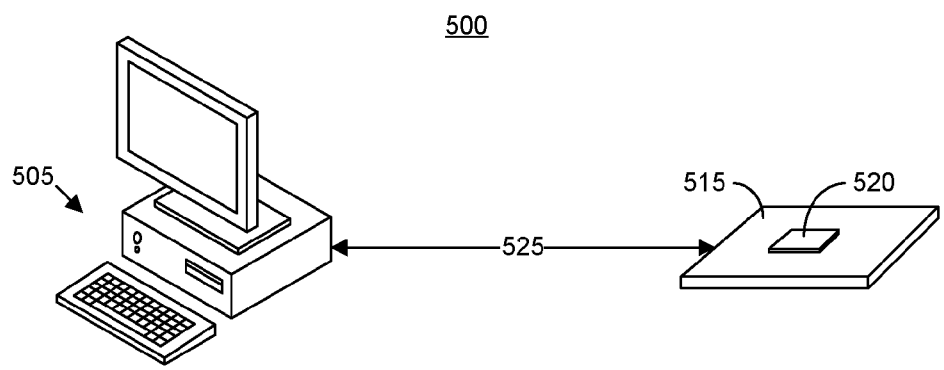
FIG. 5 is a block diagram illustrating an exemplary emulation environment.

FIG. 5 is a block diagram illustrating an exemplary emulation environment (environment) 500. As pictured, environment 500 includes a data processing system 505. Data processing system 505, for example, may be implemented as a computer system or the like. Data processing system 505 is coupled to a target platform 515 through a communication link 525.

Target platform 515 may be implemented as a circuit board such as a printed circuit board having circuitry implemented thereon. Target platform 515 further may be included within a larger system. Target platform 515 may include a connector that couples to communication link 525. The connector may be coupled, using circuitry of target platform 515, to an IC 520. IC 520 is coupled to target platform 515 using a socket, a receptacle, another mounting technique such as soldering IC 520 directly to target platform 515, or the like. IC 520 couples to communication link 525 through target platform 515. In one aspect, IC 520 is a programmable IC. In another aspect, IC 520 is an SOC. IC 520 may be used to emulate a circuit design. The circuit design may be a custom circuit design such as an ASIC circuit design that includes two or more power domains.

As noted, data processing system 505 is coupled to target platform 515 through communication link 525. Communication link 525 may be implemented as any of a variety of different wired and/or wireless connections. Exemplary wired implementations of communication link 525 include, but are not limited to, point-to-point Ethernet, Universal Serial Bus (USB), FireWire (IEEE 1394 interface), or the like. Exemplary wireless implementations of communication link 525 include, but are not limited to, Bluetooth®, Wi-Fi®, or the like. In the case of a wireless implementation of communication link 525, the connector of target platform 515 may be implemented as a wireless transceiver. The exemplary communication links noted within this disclosure are provided for purposes of illustration only and are not intended as limitations.

In operation, a user may operate data processing system 505. Under instruction from the user, data processing system 505 processes a circuit design that includes a plurality of power domains. Data processing system 505 processes the circuit design for implementation within, and emulation using, IC 520. A processed version of the circuit design may be provided to target platform 515 through communication link 525 and loaded into IC 520. Loading the processed version of the circuit design within IC 520 implements the processed circuit design within IC 520.

Figure 6:
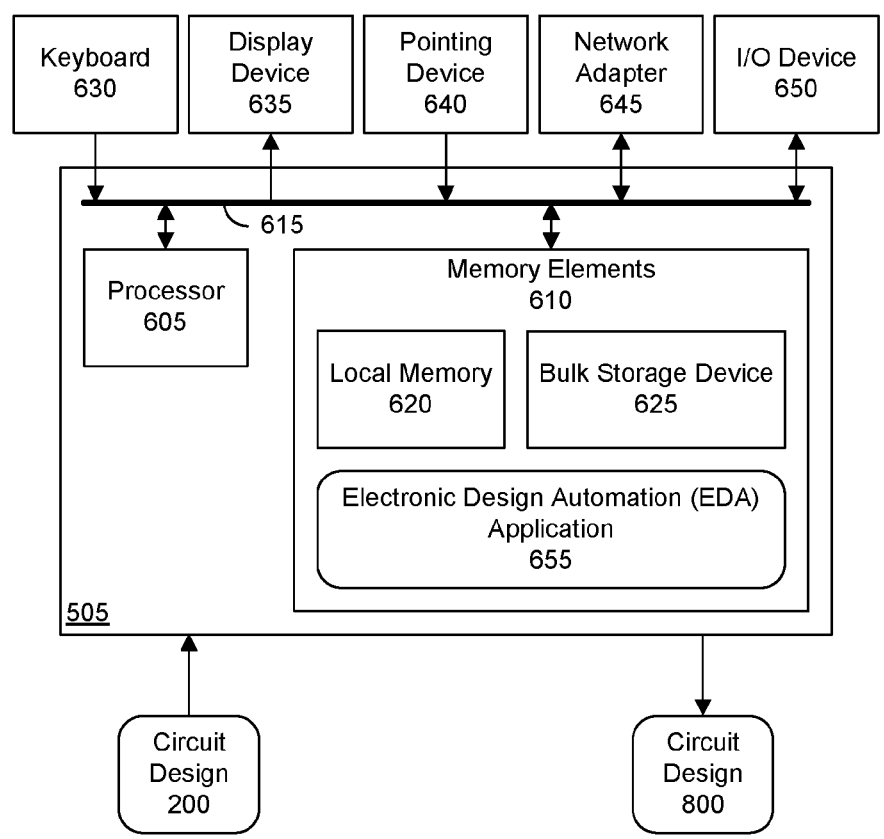
FIG. 6 is a block diagram illustrating an exemplary data processing system.

FIG. 6 is a block diagram illustrating an exemplary implementation of data processing system 505 of FIG. 5. Data processing system 505 includes at least one processor 605, e.g., a central processing unit (CPU), coupled to memory elements 610 through a system bus 615 or other suitable circuitry. Data processing system 505 stores program code, e.g., EDA application 655, within memory elements 610. Processor 605 executes the program code accessed from memory elements 610 via system bus 615. In one aspect, data processing system 505 may be used to implement a computer or other system that is suitable for storing and/or executing program code. It should be appreciated, however, that the architecture illustrated in FIG. 6 may be used to implement any system including a processor and memory that is capable of performing the functions described within this disclosure.

Memory elements 610 include one or more physical memory devices such as, for example, a local memory 620 and one or more bulk storage devices 625. Local memory 620 may be implemented as a random access memory (RAM) or other non-persistent memory device(s) generally used during actual execution of the program code. Bulk storage device 625 may be implemented as a hard disk drive (HDD), solid state drive (SSD), or other persistent data storage device. Data processing system 505 also may include one or more cache memories (not shown) that provide temporary storage of at least some program code in order to reduce the number of times program code must be retrieved from the bulk storage device during execution.

Input/output (I/O) devices such as a keyboard 630, a display device 635, and a pointing device 640 optionally may be coupled to data processing system 505. The I/O devices may be coupled to data processing system 505 either directly or through intervening I/O controllers. A network adapter 645 may also be coupled to data processing system 505 to enable data processing system 505 to become coupled to other systems, computer systems, remote printers, remote storage devices, and/or target platform 515 of FIG. 5 through intervening private or public networks. Modems, cable modems, Ethernet cards, and wireless transceivers are examples of different types of network adapter 645 that may be used with data processing system 505. An input/output (I/O) device 650 such as a USB port, a FireWire port, or the like also may be coupled to data processing system 505 to allow data processing system 505 to become coupled to another system such as any of the aforementioned systems including target platform 515 of FIG. 5.

Memory elements 610 store EDA application 655. In one aspect, EDA application 655 may include one or more different components or modules. EDA application 655, being implemented in the form of executable program code, is executed by data processing system 505. As such, EDA application 655 is considered an integrated part of data processing system 505. Data processing system 505, while executing EDA application 655, communicates with target platform 515 of FIG. 5. EDA application 655 and any data items used, generated, and/or operated upon by data processing system 505 while executing EDA application 655 are functional data structures that impart functionality when employed as part of data processing system 505.

In operation, data processing system 505 receives a circuit design such as circuit design 200 as an input. Circuit design 200 may be specified in programmatic form. For example, circuit design 200 may be specified in a hardware description language, in register transfer level (RTL) form, or the like. Circuit design 200 may be a custom circuit design for an ASIC, for example. Further, circuit design 200 includes two or more power domains. As discussed, a power domain is a portion of a circuit design where the component(s) are powered on and off collectively as a group and independently of other power domains within the circuit design. A power region refers to a physical region of an IC wherein a power domain is implemented.

Data processing system 505 operates upon circuit design 200. More particularly, data processing system 505 modifies circuit design 200 to generate circuit design 800. The modifications introduced by data processing system 505 into circuit design 200 result in circuit design 800, which may be implemented within a programmable IC to emulate operation of the power domains specified within circuit design 200.

Figure 7:
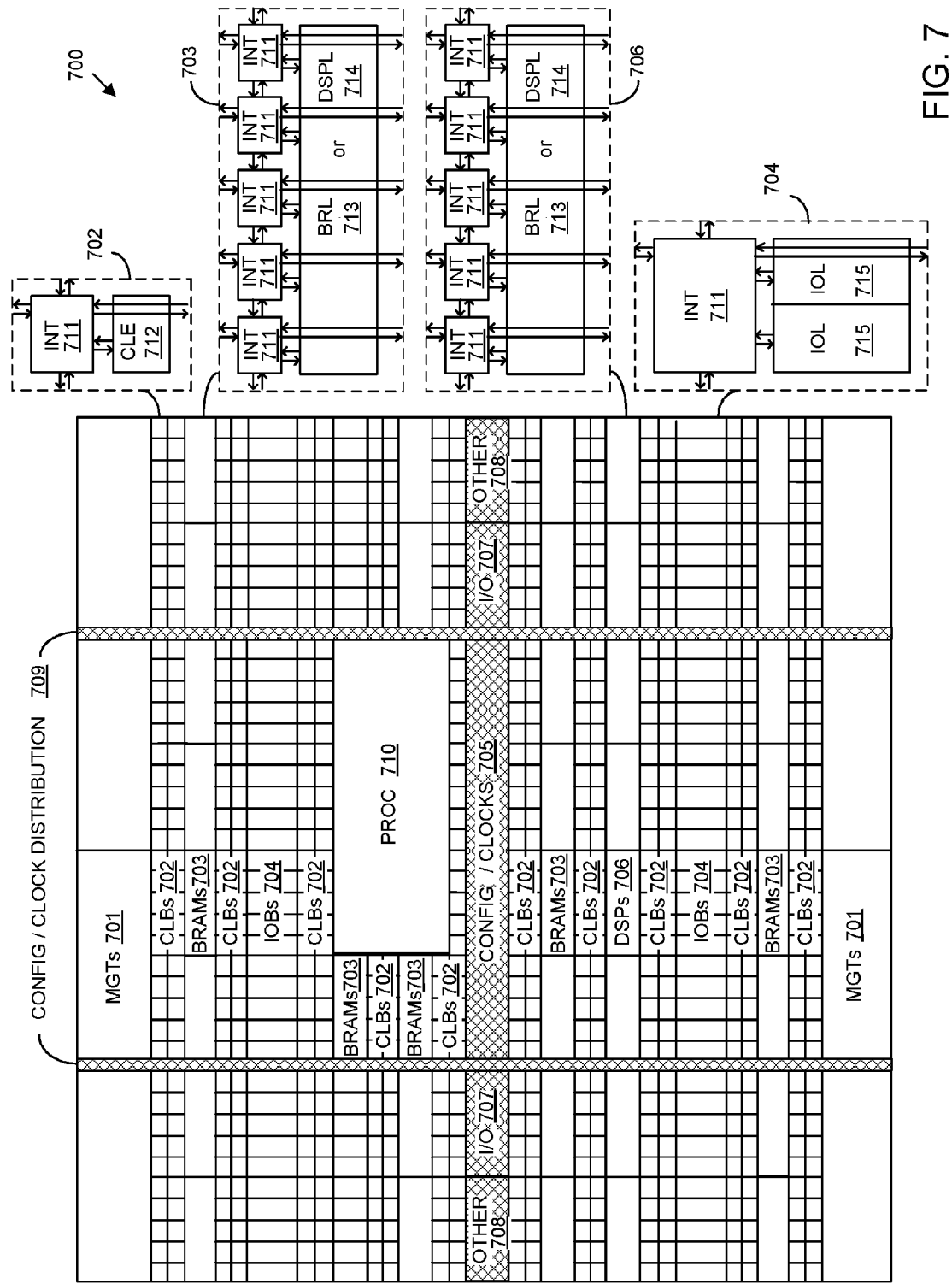
FIG. 7 is an exemplary architecture for an IC.

FIG. 7 is a block diagram illustrating an exemplary architecture 700 for an IC. For example, architecture 700 may be used to implement IC 520 of FIG. 5. In one aspect, architecture 700 is implemented within a field programmable gate array (FPGA) type of IC. Architecture 700 is also representative of an SOC type of IC. As noted, an SOC is an IC that includes a processor that executes program code, e.g., user program code, and one or more other circuits and/or circuit systems. The circuits and/or circuit systems may operate cooperatively with one another and with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at right edge of FIG. 7.

For example, a CLB 702 can include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) may also be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. As will be clear to those of skill in the art, the actual I/O pads connected, for example, to IOL 715 typically are not confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column are used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 is implemented as a dedicated circuitry, e.g., as a hard-wired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 is omitted from architecture 700 and replaced with one or more of the other varieties of the programmable blocks described. Further, such blocks may be utilized to form a "soft processor" in that the various blocks of programmable circuitry may be used to form a processor that executes program code as is the case with PROC 710.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 7 that are external to PROC 710 such as CLBs 702 and BRAMs 703 are considered programmable circuitry of the IC. Programmable circuitry may be configured or programmed to implement different physical circuits therein.

In general, the functionality of programmable circuitry is not established until configuration data is loaded into the IC. A set of configuration bits may be used to program programmable circuitry of an IC such as an FPGA. The configuration bit(s) are typically referred to as a "configuration bitstream." In general, programmable circuitry is not operational or functional without first loading a configuration bitstream into the IC. The configuration bitstream effectively implements or instantiates a particular physical circuit within the programmable circuitry. The configuration bitstream or circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 7 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely exemplary. In an actual IC, for example, more than one adjacent column of CLBs may be included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as a limitation.

Figure 8:
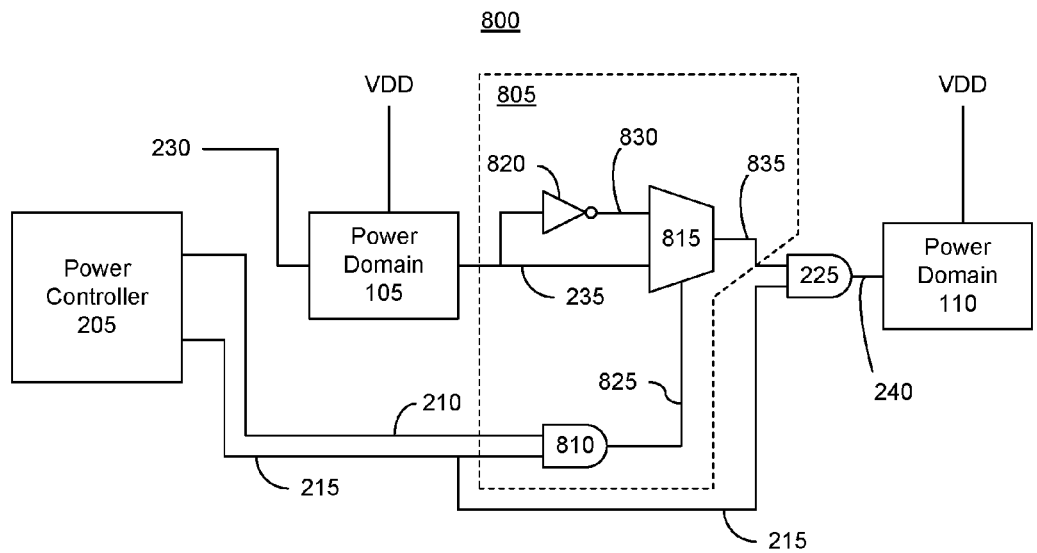
FIG. 8 is a block diagram illustrating an exemplary circuit design for emulating power gating.

FIG. 8 is a block diagram illustrating an exemplary implementation of circuit design 800 for emulating power gating. As discussed, circuit design 800 is a version of circuit design 200 that may be implemented within a programmable IC for purposes of emulation. Circuit design 200 of FIG. 2 is processed by data processing system 505 to generate circuit design 800.

As pictured, circuit design 800 includes power controller 205, power region 105, and power region 110. Power gate circuit 220 is removed. In consequence, the power supply VDD is coupled directly to power domain 105. Further, a power gate emulation circuit (emulation circuit) 805 is inserted into circuit design 800. Power gate signal 210, isolation signal 215, and output signal 235 are provided, or coupled, to emulation circuit 805.

Emulation circuit 805 includes a detector circuit 810, a multiplexer circuit (multiplexer) 815, and an inverter circuit (inverter) 820. Power gate signal 210 is provided to a first input of detector circuit 810. Isolation signal 215 is provided to a second input of detector circuit 810. Detector circuit 810 generates a selector signal 825 that is coupled to a selector input or port of multiplexer 815. In one aspect, detector circuit 810 is implemented as an AND logic gate.

Output signal 235 from power domain 105 is provided to inverter 820, which generates an inverted version of output signal 235 referred to as signal 830. Signal 830 is provided to a first input of multiplexer 815. Output signal 235 is provided to a second input of multiplexer 815. Multiplexer 815 passes either signal 830 or output signal 235 as output signal 835 responsive to selector signal 825. As pictured, isolation circuit 225 receives output signal 835 at a first input and isolation signal 215 at a second input.

Emulation circuit 805 is configured to detect invalid states in reference to power gate signal 210 and isolation signal 215. Under normal circumstances, when the timing of power gate signal 210 and isolation signal is correct, as illustrated in FIG. 3, power gate signal 210 and isolation signal 215 are not at logic high values concurrently. In consequence, detector circuit 810 outputs signal 825 with a logic low value, which selects the second input of multiplexer 815. Multiplexer 815 passes signal 235 as output signal 835.

In the case of an invalid state, power gate signal 210 and isolation signal 215 are at a logic high concurrently as illustrated in FIG. 4. During the invalid state, detector circuit 810 outputs signal 825 with a logic high value, which selects the first input of multiplexer 815. Multiplexer 815 passes signal 830 as output signal 835. Thus, in the case of an invalid state, emulation circuit 805 passes an inverted value of the output of power domain 105 to isolation circuit 225. Isolation circuit 225 propagates, or outputs the inverted value to power domain 110 due to the timing error between power gate signal 210 and isolation signal 215.

Propagation of the inverted value creates a functional failure in the design, e.g., in power domain 110, that may be observed when implemented in a programmable IC. In this manner, invalid states for power domain control signals may be detected and observed during emulation of a circuit design using a programmable IC.

Figure 9:
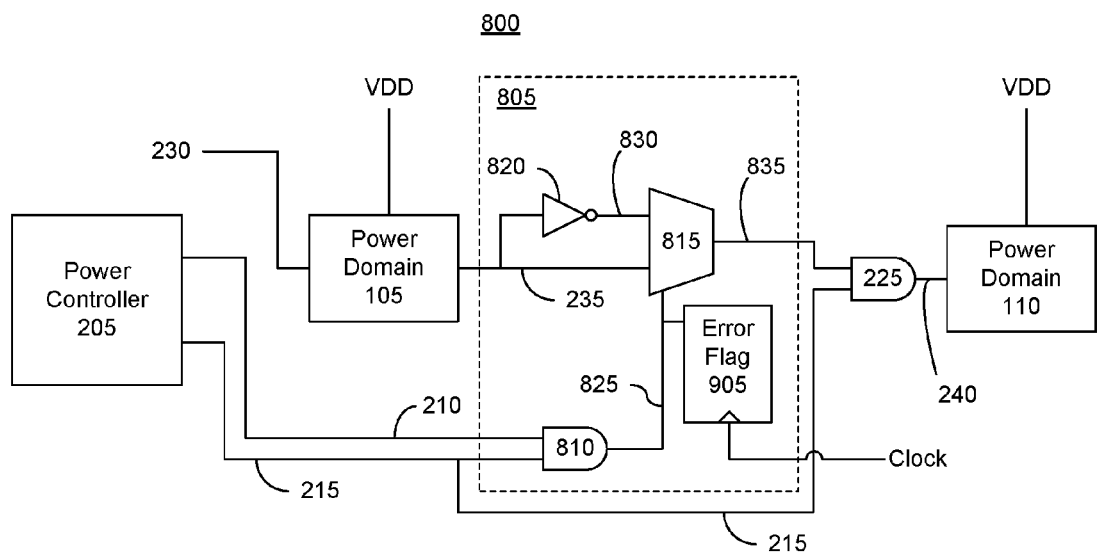
FIG. 9 is a block diagram illustrating another exemplary implementation of a circuit design for emulating power gating.

FIG. 9 is a block diagram illustrating another exemplary implementation of circuit design 800 for emulating power gating. FIG. 9 represents an optional implementation of circuit design 800 that may be generated by data processing system 505. Circuit design 800 of FIG. 9 is substantially similar to the circuit design of FIG. 8. Unlike the circuit design of FIG. 8, however, data processing system has inserted an error flag 905. As pictured, error flag 905 has an input coupled to signal 825 and a clock port coupled to a clock signal.

Error flag 905 is configured to store the value of signal 825 responsive to signal 825 taking on a logic high value. As noted, a logic high value on signal 825 indicates that invalid states for power gate signal 210 and isolation signal 215 are detected. In one aspect, error flag 905 is implemented as a memory, e.g., one or more registers, RAM, or the like. In another aspect, error flag 905 may be implemented as a counter configured to count instances where signal 825 takes on a logic high value, e.g., count occurrences of the invalid state.

It should be appreciated that while FIGS. 8 and 9 are described as circuit designs, each also represents an implementation of the physical circuitry that may be implemented within a programmable IC such as programmable IC 520 or another IC having an architecture as described with reference to FIG. 7.

Figure 10:
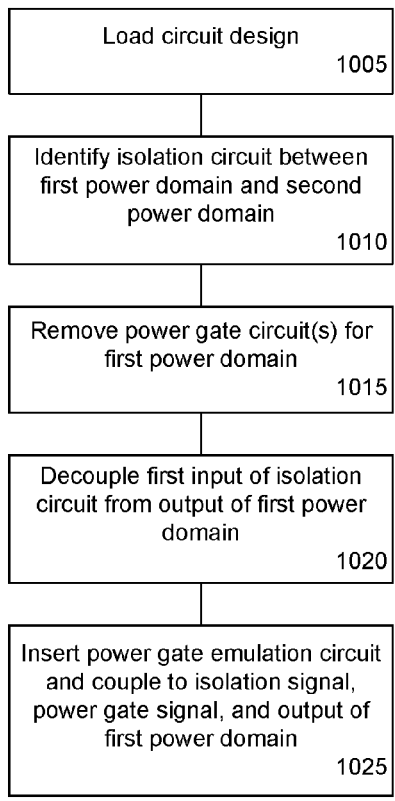
FIG. 10 is a flow chart illustrating an exemplary method of processing a circuit design.

FIG. 10 is a flow chart illustrating an exemplary method 1000 of processing a circuit design. Method 1000 may be implemented by data processing system (system) 505 described with reference to FIGS. 5 and 6.

Method 1000 may begin in block 1005, where the system loads a circuit design. The circuit design may be for an ASIC or other IC having two or more power domains. The circuit design may be specified in RTL or in another form. It should be appreciated that within the circuit design, the power domains and signal crossings between power domains are fully defined using any of a variety of known standards and/or syntax that may be searched by the system to detect a boundary between two independent power domains and/or isolation circuitry between two independent power domains.

In one aspect, the system may search the circuit design for instances of circuit elements conforming to a particular naming convention that include the term or terms "isolation" and/or "level_shift" or derivations thereof. Further, the system may search for power domain names specified or designated within the circuit design using statements such as "create_power_domain" or the like used to declare power domains where the name follows, etc. The particular terms for which the system searches will vary according to the particular formatting or type of RTL and/or hardware description language used to specify the circuit design. In this regard, the examples provided are intended to be illustrative and not limiting of the inventive arrangements disclosed herein.

In block 1010, the system identifies an isolation circuit that is between a first power domain and a second power domain. The isolation circuit has a first input coupled to an output of the first power domain, a second input coupled to an isolation signal, and an output coupled to an input of the second power domain.

In block 1015, the system removes the power gate circuit for the first power domain from the circuit design. The power gate circuit is configured to selectively decouple the first power domain from a power supply responsive to a power gate signal. It should be appreciated that block 1015 is directed to the example of FIG. 2. As such, only one power gate circuit is described as being removed since the second power domain does not have a power gate circuit. In the general case, however, power gate circuits for power domains are removed from the circuit design. Power gate circuits are removed from the circuit design in block 1015 whether a single power gate circuit is removed or more than one power gate circuit is removed.

In block 1020, the system decouples the first input of the isolation circuit from the output of the first power domain. In block 1025, the system inserts an emulation circuit into the circuit design. The system couples the emulation circuit to the isolation signal, the power gate signal, and the output of the first power domain. The emulation circuit is configured to selectively pass an output signal from the output of the first power domain or an inverted version of the output signal of the first power domain to the first input of the isolation circuit according to a state of the power gate signal and a state of the isolation signal. For example, the power gate emulation circuit passes the inverted version of the output signal of the first power domain to the first input of the isolation circuit responsive to detecting an invalid state between the power gate signal and the isolation signal.

FIG. 10 presents an exemplary method of processing a circuit design as described with reference to FIG. 2. It should be appreciated that the power gate circuits that exist in the circuit design are removed and, in effect, replaced with emulation circuits. Those skilled in the art will recognize that the operations described with reference to FIG. 10 may be applied across a circuit design and used to remove power gate circuits and insert emulation circuits as needed for power domain emulation.

Figure 11:
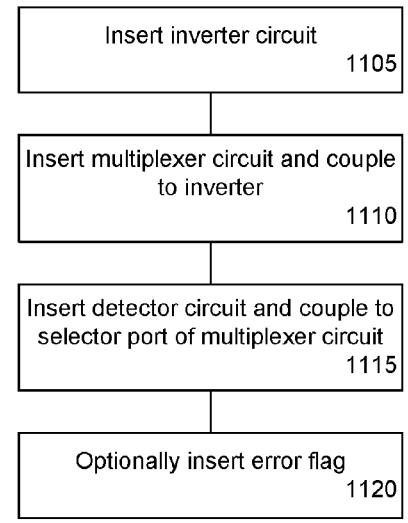
FIG. 11 is a flow chart illustrating more detailed operations for block 1025 of FIG. 10.

FIG. 11 is a flow chart illustrating operations performed in block 1025 of FIG. 10. In block 1105, the system inserts an inverter circuit coupled to the output data signal of the first power domain. The inverter is configured to generate the inverted version of the output data signal of the first power domain. In block 1110, the system inserts a multiplexer circuit having a first input coupled to the output signal of the first power domain and a second input coupled to the inverted version of the output signal of the first power domain.

In block 1115, the system inserts a detector circuit having a first input coupled to the isolation signal and a second input coupled to the power gate signal. The detector circuit is configured to generate an output signal that is coupled to a selector input of the multiplexer circuit. The detector circuit may be implemented as an AND logic circuit.

In block 1120, the system optionally inserts an error flag into the circuit. In one example, the system inserts a memory as the error flag. The memory includes an input coupled to the output signal generated by the detector circuit. The memory stores an indication of an occurrence of the invalid state between the isolation signal and the power gate signal. In another example, the system inserts a counter as the memory flag. The counter has an input coupled to the output signal generated by the detector circuit. The counter is configured to count occurrences of the invalid state between the isolation signal and the power gate signal.

It should be appreciated that the circuit design may be processed further by performing optimizations and converting the circuit design into a configuration bitstream. For example, the system may send the configuration bitstream to target platform 515 and load the configuration bitstream into IC 520. Having loaded the configuration bitstream, the circuit design, including operation of the power domains, may be emulated within the IC.

For example, the resulting IC after configuration will implement circuitry similar to the circuit designs illustrated in FIG. 8 or FIG. 9. Accordingly, the IC may include a first power region corresponding to the first power domain, a second power region corresponding to the second power domain, and a power gate emulation circuit. The power gate emulation circuit is coupled to an output signal of the first power region, an isolation signal for the second power region, and a power gate signal for the first power region. The IC further includes an isolation circuit having a first input coupled to an output of the emulation circuit, a second input coupled to the isolation signal, and an output coupled to an input of the second power region. The power gate emulation circuit is configured to pass the output signal of the first power region or an inverted version of the output signal of the first power region according to a state of the power gate signal and a state of the isolation signal. An error flag optionally may be included.

The system may read results from IC 520 whether by reading output pins or particular registers of the second power domain (second power region as implemented within IC 520) to determine a functional failure in consequence of the second power region receiving an inverted output from the first power region. In another aspect, the system may read the error flag to determine whether an invalid state has occurred and/or the number of invalid states having occurred within a given period of time in the case of a counter type of error flag.

In accordance with the inventive arrangements described herein, power domain operation, or power region operation, for a circuit design may be emulated using a programmable IC. The circuit design to be emulated may be processed to remove various components such as power gate circuitry and include power gate emulation circuitry. The resulting circuit design, when loaded into a programmable IC, accurately emulates the original circuit design including the control signals provided to power regions for powering such regions on and/or off. The emulation circuit detects invalid states that may occur between the control signals.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

As defined herein, the term "automatically" means without user intervention. As defined herein, the term "user" means a human being. The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when," "upon," "in response to determining," "in response to detecting," "responsive to determining," or "responsive to detecting," depending on the context. Similarly, the phrase "if it is determined" or the phrase "if [a stated condition or event] is detected" may be construed to mean "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent blocks or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A method of processing a circuit design includes identifying an isolation circuit having a first input coupled to an output of a first power domain, a second input coupled to an isolation signal, and an output coupled to an input of a second power domain, removing a power gate circuit configured to selectively decouple the first power domain from a power supply responsive to a power gate signal, and decoupling the first input of the isolation circuit from the output of the first power domain. The method further includes inserting, using a processor, a power gate emulation circuit coupled to the isolation signal, the power gate signal, and the output of the first power domain.

In one aspect, the power gate emulation circuit may be configured to pass an output signal from the output of the first power domain or an inverted version of the output signal of the first power domain to the first input of the isolation circuit according to a state of the power gate signal and a state of the isolation signal.

In another aspect, the power gate emulation circuit may be configured to pass the inverted version of the output signal of the first power domain to the first input of the isolation circuit responsive to detecting an invalid state between the power gate signal and the isolation signal.

Inserting a power gate may include inserting an inverter circuit coupled to the output data signal of the first power domain, wherein the inverter circuit is configured to generate the inverted version of the output data signal of the first power domain, inserting a multiplexer circuit including a first input coupled to the output signal of the first power domain and a second input coupled to the inverted version of the output signal of the first power domain, and inserting a detector circuit including a first input coupled to the isolation signal and a second input coupled to the power gate signal. The detector circuit is configured to generate an output signal coupled to a selector input of the multiplexer circuit.

The detector circuit may be configured to perform a logical AND operation using the isolation signal and the power gate signal.

Inserting a power gate emulation circuit may also include inserting a memory having an input coupled to the output signal generated by the detector circuit. The memory is configured to store an indication of the invalid state between the isolation signal and the power gate signal.

Inserting a power gate emulation circuit also may include inserting a counter having an input coupled to the output signal generated by the detector circuit. The counter is configured to count occurrences of the invalid state between the isolation signal and the power gate signal.

A system includes a processor programmed to initiate executable operations including identifying an isolation circuit having a first input coupled to an output of a first power domain, a second input coupled to an isolation signal, and an output coupled to an input of a second power domain, removing a power gate circuit configured to selectively decouple the first power domain from a power supply responsive to a power gate signal, and decoupling the first input of the isolation circuit from the output of the first power domain. The executable operations also include inserting a power gate emulation circuit coupled to the isolation signal, the power gate signal, and the output of the first power domain.

In one aspect, the power gate emulation circuit may be configured to pass the inverted version of the output signal of the first power domain to the first input of the isolation circuit responsive to detecting an invalid state between the power gate signal and the isolation signal.

Inserting a power gate emulation circuit may include inserting an inverter circuit coupled to the output data signal of the first power domain, wherein the inverter circuit is configured to generate the inverted version of the output data signal of the first power domain, inserting a multiplexer circuit including a first input coupled to the output signal of the first power domain and a second input coupled to the inverted version of the output signal of the first power domain, and inserting a detector circuit including a first input coupled to the isolation signal and a second input coupled to the power gate signal. The detector circuit is configured to generate an output signal coupled to a selector input of the multiplexer circuit.

The detector circuit may be configured to perform a logical AND operation using the isolation signal and the power gate signal.

Inserting a power gate emulation circuit may include inserting a memory having an input coupled to the output signal generated by the detector circuit. The memory is configured to store an indication of the invalid state between the isolation signal and the power gate signal.

Inserting a power gate emulation circuit also may include inserting a counter having an input coupled to the output signal generated by the detector circuit. The counter is configured to count occurrences of the invalid state between the isolation signal and the power gate signal.

An IC includes a first power region, a second power region, and a power gate emulation circuit coupled to an output signal of the first power region, an isolation signal for the second power region, and a power gate signal for the first power region. The IC also includes an isolation circuit that includes a first input coupled to an output of the power gate emulation circuit, a second input coupled to the isolation signal, and an output coupled to an input of the second power region. The power gate emulation circuit is configured to pass the output signal of the first power region, or an inverted version of the output signal of the first power region, according to a state of the power gate signal and a state of the isolation signal.

The power gate emulation circuit may be configured to pass the inverted version of the output signal of the first power region to the first input of the isolation circuit responsive to detecting an invalid state between the power gate signal and the isolation signal.

The power gate emulation circuit may include an inverter circuit coupled to the output data signal of the first power region, wherein the inverter circuit is configured to generate the inverted version of the output signal of the first power region, a multiplexer circuit having a first input coupled to the output signal of the first power region and a second input coupled to the inverted version of the output signal of the first power region, and a detector circuit coupled to the isolation signal and the power gate signal. The detector circuit is configured to generate an output signal coupled to a selector input of the multiplexer circuit.

The detector circuit may be configured to perform a logical AND operation using the isolation signal and the power gate signal.

The multiplexer circuit may be configured to pass the inverted version of the output signal of the first power region to the isolation circuit responsive to the output signal of the detector circuit indicating an invalid state between the isolation signal and the power gate signal.

In one aspect, the IC may include a memory having an input coupled to the output signal generated by the detector circuit. The memory is configured to store an indication of the invalid state between the isolation signal and the power gate signal.

In another aspect, the IC may include a counter having an input coupled to the output signal generated by the detector circuit. The counter counts occurrences of the invalid state between the isolation signal and the power gate signal.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method of processing a circuit design, comprising:
   identifying an isolation circuit having a first input coupled to an output of a first power domain, a second input coupled to an isolation signal, and an output coupled to an input of a second power domain;
   removing a power gate circuit configured to selectively decouple the first power domain from a power supply responsive to a power gate signal;
   decoupling the first input of the isolation circuit from the output of the first power domain; and
   inserting, using a processor, a power gate emulation circuit coupled to the isolation signal, the power gate signal, and the output of the first power domain;
   wherein the power gate emulation circuit is configured to pass an output signal from the output of the first power domain, or an inverted version of the output signal of the first power domain, to the first input of the isolation circuit according to a state of the power gate signal and a state of the isolation signal; and
   wherein the circuit design is adapted for implementation within an integrated circuit.

2. The method of claim 1, wherein the power gate emulation circuit is configured to pass the inverted version of the output signal of the first power domain to the first input of the isolation circuit responsive to detecting an invalid state between the power gate signal and the isolation signal.

3. The method of claim 1, wherein inserting a power gate emulation circuit comprises:
   inserting an inverter circuit coupled to the output data signal of the first power domain;
   wherein the inverter circuit is configured to generate the inverted version of the output data signal of the first power domain;
   inserting a multiplexer circuit comprising a first input coupled to the output signal of the first power domain and a second input coupled to the inverted version of the output signal of the first power domain; and inserting a detector circuit comprising a first input coupled to the isolation signal and a second input coupled to the power gate signal;

wherein the detector circuit is configured to generate an output signal coupled to a selector input of the multiplexer circuit.

4. The method of claim 3, wherein the detector circuit is configured to perform a logical AND operation using the isolation signal and the power gate signal.

5. The method of claim 3, wherein inserting a power gate emulation circuit further comprises:

inserting a memory comprising an input coupled to the output signal generated by the detector circuit;

wherein the memory is configured to store an indication of the invalid state between the isolation signal and the power gate signal.

6. The method of claim 3, wherein inserting a power gate emulation circuit further comprises:

inserting a counter comprising an input coupled to the output signal generated by the detector circuit;

wherein the counter is configured to count occurrences of the invalid state between the isolation signal and the power gate signal.

7. A system, comprising:

a processor programmed to initiate executable operations comprising:

identifying an isolation circuit having a first input coupled to an output of a first power domain, a second input coupled to an isolation signal, and an output coupled to an input of a second power domain;

removing a power gate circuit configured to selectively decouple the first power domain from a power supply responsive to a power gate signal;

decoupling the first input of the isolation circuit from the output of the first power domain; and inserting a power gate emulation circuit coupled to the isolation signal, the power gate signal, and the output of the first power domain;

wherein the power gate emulation circuit is configured to pass an output signal from the output of the first power domain, or an inverted version of the output signal of the first power domain, to the first input of the isolation circuit according to a state of the power gate signal and a state of the isolation signal; and wherein the circuit design is adapted for implementation within an integrated circuit.

8. The system of claim 7, wherein inserting a power gate emulation circuit comprises:

inserting an inverter circuit coupled to the output data signal of the first power domain;

wherein the inverter circuit is configured to generate the inverted version of the output data signal of the first power domain;

inserting a multiplexer circuit comprising a first input coupled to the output signal of the first power domain and a second input coupled to the inverted version of the output signal of the first power domain; and inserting a detector circuit comprising a first input coupled to the isolation signal and a second input coupled to the power gate signal;

wherein the detector circuit is configured to generate an output signal coupled to a selector input of the multiplexer circuit.

9. The system of claim 8, wherein the detector circuit is configured to perform a logical AND operation using the isolation signal and the power gate signal.

10. The system of claim 8, wherein inserting a power gate emulation circuit further comprises:

inserting a memory comprising an input coupled to the output signal generated by the detector circuit;

wherein the memory is configured to store an indication of the invalid state between the isolation signal and the power gate signal.

11. The system of claim 8, wherein inserting a power gate emulation circuit further comprises:

inserting a counter comprising an input coupled to the output signal generated by the detector circuit;

wherein the counter is configured to count occurrences of the invalid state between the isolation signal and the power gate signal.

* * * * *